Figure 1:
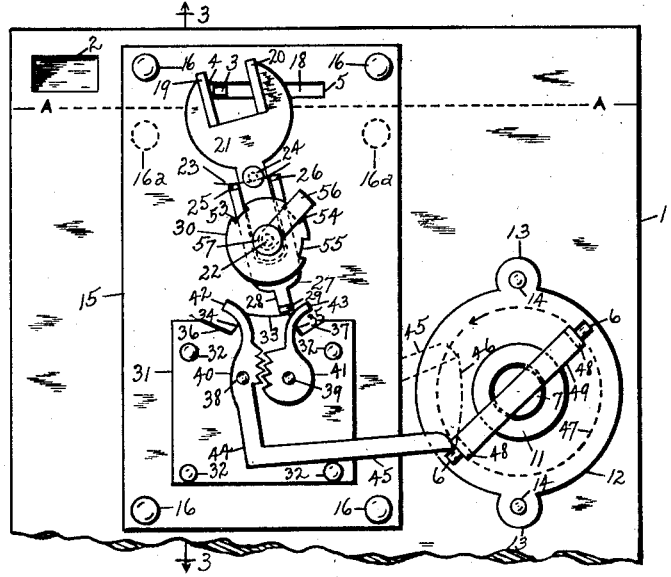

May 19, 1931. L. W. ROSEN 1,805,707

SHUTTER LOCKING DEVICE FOR CAMERAS

Filed Dec. 13, 1922

WITNESSES

INVENTOR

Patented May 19, 1931

1,805,707

UNITED STATES PATENT OFFICE

LOUIS W. ROSEN, OF BROOKLYN, NEW YORK

SHUTTER-LOCKING DEVICE FOR CAMERAS

Application filed December 13, 1922. Serial No. 606,633.

The object of my invention is to provide means for attachment to what is commonly known as a box camera, for the purpose of preventing a double exposure of any portion of the film. While my invention relates distinctly to box cameras, as distinguished from the folding type, it is understood that my improved mechanism may be applied to any kind of camera that employs means for exposing and shifting a film similar or substantially similar to the means now in use in the conventional box camera.

An important feature of my invention is the fact that my improved mechanism need not necessarily be built with the camera, but may be attached by hand, simply and effectively, to the conventional camera after the latter has been turned out in the ordinary way. The advantage of this lies in the privilege by the consumer to obtain the conventional camera at his choice and at the ordinary price, and then to improve it with my mechanism at his own volition and whenever circumstances prompt him to do so.

Another important feature of my invention lies in the means for moving the conventional shutter lever. At present it is very inconvenient for the operator to grip this lever and move it, as it does, in an angular course back and forth in the regular slot. When resting at either end of said slot, this lever is also very difficult to pick up, followed by the movement just described, which makes the grip by the operator entirely unsteady. With my improved means, the operator is given not only a full grip at the start, but this grip remains constant throughout the lever movement, regardless of the angular movement of said lever.

Another important feature of my invention consists of an auxiliary and detachable handle, which can be attached to the horizontal film-winding bar in the conventional box camera, and the means for securing such attachment by hand and without change of structure of the parts in said camera. This auxiliary handle can be stationarily placed in a position horizontal with said bar, or at right angles to the same to facilitate the turning of said bar and the winding of the film.

While auxiliary handles, quite similar to this, are now commonly used on the more expensive or folding cameras, nevertheless they have to be installed at the factory, involving also a modification of structure of the simple bar on the box camera. With this additional feature of my invention, in view of the fact that I employ the auxiliary winding handle because of operative connection with my shutter-locking mechanism, and which mechanism can be attached manually as aforesaid, the owner of a box camera with the plain winding bar can attach all the related parts of my improved mechanism by hand and without the use of tool or change of structure, despite the structure of the plain winding bar. Incidentally, this same feature of my invention makes it possible for the owner of a box camera with the plain winding bar, to secure for himself the use and advantage of this auxiliary and manually attachable handle for the independent benefit derived from it, regardless of the installation or use of my shutter locking mechanism.

Another important feature of my invention is the provision for time exposure, for which exposure, in the conventional camera, the shutter lever must be operated back and forth, and not just one way, in order to complete an exposure. With the means I employ, the improved mechanism may be set to lock the shutter lever only after the exposure has been completed, regardless of the double movement to effect such exposure, and regardless also from which end the double movement of the lever is commenced.

In the accompanying drawings, I have illustrated a box camera where access to the film spools is had by sliding out the inner compartment after opening the door in the rear of the camera away from the shutter. Being mindful of the other type, having no rear door, and where access to the film spools is gained by sliding out the inner compartment from the opposite or forward end of the camera, and to which compartment is attached the portion of the forward end of the camera carrying the shutter lever and mechanism, I have made my device all embracing for use in either type of camera.

For a more particular description of my invention, reference is to be had to the accompanying drawings, forming a part hereof, in which Fig. 1 is a top plan view of my improved mechanism, attached to the forward or shutter end of a box camera revealed only in part, in which the parts are shown in unlocked position and set for time exposure.

Figure 2:
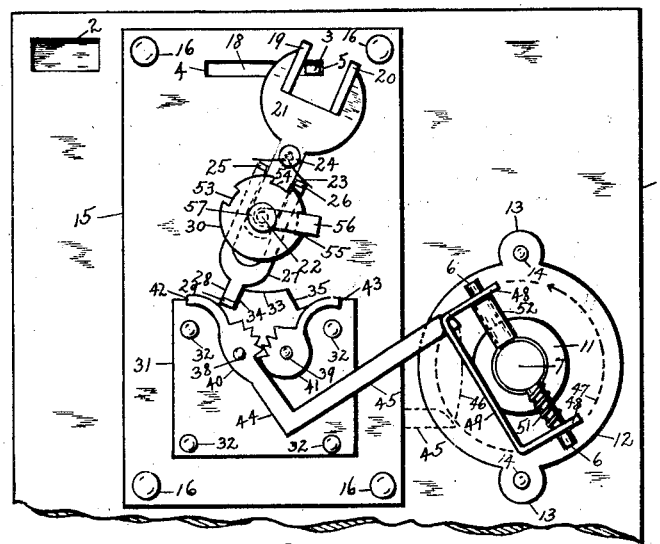

Fig. 2 is a view similar to Fig. 1, but with the parts shown in locked position and set for instantaneous exposure and depicting the exposure regulating mechanism as being set for instantaneous exposure instead of for time exposure as in Fig. 1.

Figures 3, 4:
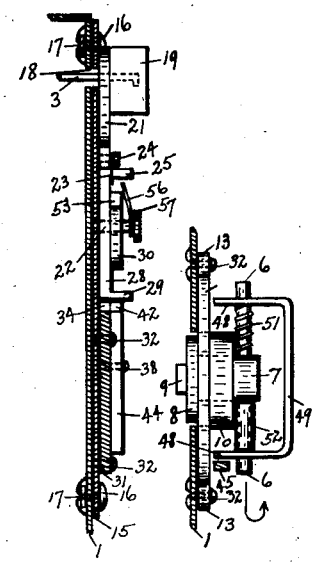

Fig. 3 is a side view of the shutter-locking mechanism, partially in section along the line 3—3 of Fig. 1 but with the parts in position where number 19 touches number 3 midway between positions numbers 4 and 5.

Fig. 4 is a side view of the film-winding mechanism, including the auxiliary winding handle in right angle position and means whereby it is detachably mounted.

Figure 5:
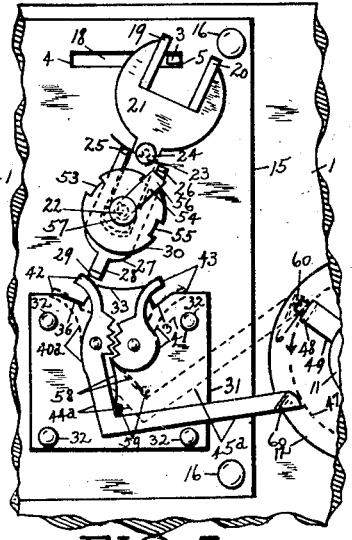

Fig. 5 is a view similar to Fig. 1, with the mechanism set for time exposure but in such position as the parts will occupy after the shutter lever has been operated once beginning at the left side, and the shutter is still open. Fig. 5 also shows a slight modification of structure in order to facilitate the start of the winding mechanism when part 48 is directly over the end of part 45 while part 49 is in turned down position.

Throughout the various views of the drawings, similar reference characters designate similar parts.

The outer wall 1 of the box camera carries and encloses the various parts necessary for the positioning and exposure of a film or other sensitive medium. Among such parts are the finder 2, the shutter lever 3 operating between positions 4 and 5, the film-winding bar 6, fixed through the hub 7, at one end of which hub is fixed the plate 8 and the key 9 for insertion in a corresponding recess of the film spool for winding and shifting the film. The said hub 7, plate 8 and key 9 revolve counter-clockwise in the bushing 10, at the top of which bushing, adjacent to the handle 6 is the cover 11 surrounding the hub 7 for keeping the latter in place. The said bushing 10 has the circular flange 12, which flange is provided with the two sides 13 for attachment to the camera box wall 1 by means of the two rivets 14. The said wall is broken away sufficiently to register with the diameter of the bushing 10, as shown in Fig. 4, and so as to permit the sliding of the key 9 from out of contact with the film spool and into the recess of the bushing 10 until the plate 8 reaches the inner side of the cover 11.

The improved shutter-locking mechanism will now be described. The plate 15 attached to the wall 1 of the camera box, by means of the fasteners 16 leading through the washers 17, has the aperture or slot 18 co-terminous with positions 4 and 5, through which the shutter lever 3 protrudes and along which it operates. On each side of the shutter lever 3 are the grips or flanges 19 and 20, rising at right angles and at equal height from the arm 21, and of greater distance apart than the width of the lever 3. The said arm 21, which is loosely mounted on the shaft 22 suitably fixed to plate 15, carries with it the wire spring 23, attached to it by means of the rivet 24. Each side of said spring bears down with equal stress on the flanges 25 and 26 of the fork 27, the two prongs of which fork closely flank each side of the lower end of the arm 21 in parallel formation. At the lower end of said fork 27 is the projection 28 with the flange 29 rising at right angles from said projection. The said fork 27, which is horizontally flush with arm 21, is kept in horizontal position by the spread of the dial 30 fixed to the shaft 22. In contact with flange 29 of said projection is the top plate 31 fixed to plate 15 by means of the rivets 32. The said top plate is of somewhat greater height from the plate 15 than the fork 27 or projection 28, but lower than the height of said flange 29 rising from said fork. The upper portion of said top plate is shaped with the curved path 33 designed to be in close contact with and limit the circular movement of the flange 29 under stress of the spring 23 bearing down on the flanges of the fork 27. At either end of said path are the sides 34 and 35 respectively, which paths are parallel with projection 28 when the latter is in position as shown in Fig. 2 or Fig. 5, or the correspondingly opposite position alongside of side 35. At the bottom of said sides respectively are the bases 36 and 37, which bases are parallel with the bottom of the flange 29 when the latter is in position as shown in Fig. 2 and Fig. 5. Mounted loosely on shafts 38 and 39, which shafts are fixed through the top plate 31 and plate 15, are the swans 40 and 41. The said swans are provided with the necks 42 and 43 respectively, are in free contact with the surface of said top plate and mesh with each other by means of the teeth in their rear. The swan 40 is further provided with the foot 44 and the extension 45 leading to the circumferential path shown by the broken line 46 over the flange 12. When the swan 40 is pivoted from position shown in Fig. 1 to position shown in Fig. 2 (full lines), the end of said extension 45 will traverse the path indicated by the dot and dash line 46 within contact distance by the tails 48 as the latter are moved counter clockwise as indicated by the arrow in path 47. The said path 47 is traversed by the tails 48 emanating from the auxiliary handle 49, which handle is operatively mounted by way of suitable holes not shown and here designated by the numeral 50 through which the two ends of the bar 6 are projected. Mounted on the bar 6 are the coiled compression spring 51 in position between the inner side of one of the tails 48 and the opposite wall of hub 7, and the tube or collar 52 in position between the inner side of the other tail 48 and the opposite wall of hub 7, the respective positions of said spring and collar being interchangeable.

The dial 30 has the uniform cuts 53, 54, and 55, each of which is designed to receive the width of the flat spring 56. The said spring 56 is loosely mounted on shaft 22, and is kept in frictional contact with the dial 30 under pressure between said dial and the head 57 fixed to shaft 22. The said spring 56 rises somewhat from the plane where it is mounted and then tapers to such extent that it will lead through any one of said cuts 53, 54, and 55, under stress, at an angle sufficient to be held from further movement in any direction by the side walls of said cuts, but not sufficient to be in frictional contact with the surface of fork 27 beneath the flanges 25 and 26.

In Fig. 5, the modified swan 40a is provided with the foot 44a and the extension 45a leading to the circumferential path shown by the broken line 47. The said foot 44a is provided with the flat spring 58 attached by means of rivet 59, and which spring is in a position to be compressed when moved against the lower edge of the swan 41 as shown by the broken lines in Fig. 5. The said extension 45a, at its end, has the bevel 60 tapering fully to the bottom of said extension and which bevel tapers down to the edge of the path 47 when in position as shown by broken lines in Fig. 5.

Operation

Assuming that my improved mechanism has not been built with the camera at the time of manufacture, and that the operator is in possession of the conventional box camera, provided with a plain bar for winding the film, the method of attachment and positioning is as follows: The plate 15, carrying the locking mechanism, is placed at the shutter end of the camera adjacent to the winding mechanism, with the shutter operating lever 3 protruding through the slot 18, as shown in Figs. 1, 2, and 5. In positioning the plate 15, care should be taken to see that the slot 18 is exactly where the terminals 4 and 5 coincide with the right and left stopping positions of the shutter lever 3, and that the narrow width of said slot is centered with reference to the path of movement of said lever in order to have the proper room on each side for avoidance of friction; also that the exterior lines of plate 15 are exactly parallel with the adjacent edges of the camera box wall 1. In such position, the entire locking mechanism will be in operative connection with the winding mechanism, especially the auxiliary handle 49 mounted on the latter. After this positioning, the operator will tap the wall 1 through the center of the holes where fasteners 16 are placed. The outer walls of most box cameras consist of cardboard or other soft substance, and it is easy then to bore a hole with a suitable hard substance through the wall 1 at each of the four places tapped, and which holes shall register with those in plate 15. The fasteners 16 are then inserted through the holes of said plate and wall, leading also through the washers 17 on the inner side of said wall. The two prongs of said fasteners 16 are then bent as shown in Fig. 3, drawing the plate 15 firmly to the top surface of the wall 1. The shutter-locking mechanism is thus in operative position. The operator then proceeds to adjust his film-winding mechanism, though either mechanism may be attached first. Either the spring 51 or the collar 52 is slipped over either end of the bar 6, the other end receiving the other of said parts. The hole 50 of one end of the handle 49 is then placed in front of the end of the bar bearing the spring 51, and such end of handle is then inserted on said bar through said hole. The other end of the handle 49, not yet mounted on the bar 6, is pushed forward beyond the unmounted end of said bar, against the tension of the spring 51, a sufficient distance to facilitate the entry of said end of bar into the remaining hole 50, after which entry the handle 49 is allowed to spring back, under the tension of spring 51, into the position which it will automatically assume for operative connection with the shutter-locking mechanism. The collar 52 forms a positive device for accurately keeping the handle 49 mounted in one fixed swinging position on the bar 6, and is of such length as to position the tails 48 for travel constantly in the path 47 for operative connection with the extension 45 of the shutter-locking mechanism. The length of the spring 51 is not necessarily limited, except that it must be such that it will still be under compression after the handle 49 is properly mounted, and exert sufficient stress to make the tail 48 at the collar-end of the bar 6 hug tightly the end of collar 52 in contact with said tail. Such tightness will assure the fixed positioning of the handle 49 as aforesaid, and will also tend to keep the said handle from ordinarily moving when positioned at any angle to said bar, including of course the right angle position for winding the film as plainly shown in Fig. 4. It is also understood that the handle 49 is to be of hard metal, so that there will be no give in the handle proper when mounting the same, nor any spread or displacement of the tails 48, and so that said handle shall retain its original form in all cases of operation.

Before the operator can take a picture by exposing the film, he must of course load his camera with a new roll of unexposed film.

This roll is inserted in the conventional way by access to the spool receptacle in the inner compartment, either through the rear door of the camera or through sliding out this compartment by way of drawing out the shutter end of the camera bearing the shutter lever 3 and mechanism in the direction away from the arm 21. In the latter instance, that to go forward will be the part of the camera beyond the line A—A of Fig. 1, the shutter lever 3 passing through the open end of the gap between the flanges 19 and 20. For such type of camera, the plate 15 is separated along the line A—A of Fig. 1, with additional fasteners 16a where shown by broken lines in said figure. However, the upper portion of plate 15, where the slot 18 is located, can then be dispensed with at the will of the operator, without seriously interfering with the effective operation of the shutter-locking mechanism, provided the lower and major portion of the plate 15 is attached in the same relative position as shown in the drawings.

After the new film roll is inserted, and the camera box closed, the operator proceeds to wind his film so as to set it for the first exposure as conventionally shown by the numeral appearing in the ruby glass in the rear of the camera. To do this, the operator sets the handle 49 from the position shown in Fig. 2 to that shown in Figs. 1 and 4 namely at right angles to the winding mechanism. The handle 49 will remain stationary in that position, owing to the pressure of spring 51 as explained before. The operator then proceeds to turn this handle counter clockwise, as indicated by the arrow in the path 47, until the film is set for the first exposure. During the turning of handle 49, the locking mechanism is automatically unlocked, regardless of the former position of the locking mechanism, and the operator can then freely work the shutter mechanism for the first exposure. The turning of the handle 49 much less than one revolution, when at right angles to the winding mechanism, will always insure an automatic unlocking of the shutter-locking mechanism, and consequent freedom to take an exposure. The maximum length of the present film roll in use in the conventional box cameras requires more than one revolution of the winding mechanism in order to position the film for each exposure, including the last exposure when the diameter of the winding spool is then the greatest. It is to be noted that when the handle 49 is turned as before stated, and in the course of its revolution the shutter-locking mechanism is automatically unlocked, a continuation of the turning of this handle, in order to reach the next numbered position for exposure, no longer interferes with the unlocked position of the locking mechanism, and whatever contact there is is merely idle.

This is accomplished in the following way: When the shutter-locking mechanism is in locked position, the extension 45 is in the position shown in full lines in Fig. 2, with the end of said extension directly and freely beneath the handle 49, as shown in said figure, and within the path 47 for contact with either one of the tails 48 when said handle is set in right angle position and more or less turned. The said extension 45 cannot get out of the position for contact, because at the position mentioned, as in Fig. 2, the foot 44, integral with extension 45, is prevented from further upward movement by contact with the lower edge of the swan 41 as shown in said figure. When the handle 49 is set in right angle position and turned counter clockwise for winding the film, the tail 48, nearer by revolution to the end of extension 45, forms contact with said end and carries it along the path shown by the dot and dash line 46 down to the position shown in full lines in Fig. 1, where it leaves said end; and synchronously at which time either the swan 40 or the swan 41 has fully thrown the projection 28 on to the curved path 33, against the tension of the spring 23, and thus unlocked the mechanism as shown by the position in Fig. 1. In such last named position, the extension 45 is free to pivot back to the position shown in full lines in Fig. 2, along the path 46, but when this happens the tails 48, in the continued course of their revolution, will merely bring the extension 45 back to the position shown by full lines in Fig. 1, but this time without affecting the projection 28 already on top of the curved path 33 out of shifting contact by either the neck 42 or the neck 43. While it is then possible for necks 42 and 43, meshed with each other, to come closer together and pivot the extension 45 away from path 47, the projection 28 will always be between said necks, and the moment the arm 21 is moved the projection 28 will form contact with either neck, according to its position, and in the course of its movement along the curved path 33 it will pivot the swans 40 and 41, so that when the projection 28 finally drops along the side 34 or 35 the extension 45 will be within the path 47 in the position shown by the full lines in Fig. 2, and ready for subsequent contact to again unlock the mechanism. If the operator is not ready to proceed with a succeeding exposure, the better plan would be not to wind the film, and thus unlock the mechanism, but to wait until actually ready for another exposure. The advantage of this lies in the protection afforded to the shutter lever 3 while the camera is being tossed around during the long intervals between exposures, under which circumstances there is always a possibility that this lever will be moved or tampered with to the extent of opening the shutter and spoiling the film in position without the knowledge or intention of the operator. When the shutter mechanism is locked, either the flange 19 or 20 obstructs the movement of the shutter operating lever 3, and consequently said lever is kept locked as against untimely pressure or outside interference. The very great care that is often exerted to keep away from the shutter lever between exposures can thus be dispensed with in my improved mechanism, and this benefit forms a separate and distinct advantage in that not only is the exposed portion of the film protected, but even no unexposed portion of the film is wasted.

When the operator is through winding the film and positioning the same for a new exposure, the handle 49 must be immediately returned from right angle position to the position shown in Fig. 2. In the latter position, a portion of handle 49 rests on the cover 11, and so remains stationary because of spring 51 as aforesaid. The portion of the width of the handle 49 extending beyond the bar 6 is less than the length of the tail 48 extending below said bar when handle 49 is in right angle position, and such width is of such dimension as to allow perfect freedom of movement of the extension 45 operating below said handle. Due to the fact that handle 49 rests on cover 11, as mentioned above, the possibility of that portion of said handle dropping within the free operative plane of extension 45 is also avoided, as otherwise there would be an interference with the proper movement of said extension. It is to be noted that after winding the film, the handle 49 must not only be turned down as in Fig. 2, but must remain in the position of path 47 reached when the winding was stopped, and that a subsequent movement of the shutter lever for an exposure will lock the shutter mechanism and bring the extension 45 to the position shown in full lines in Fig. 2. It might just be possible that after one particular winding of handle 49, the same will remain in such position as to have one side of the end of tail 48 immediately above the position where extension 45 will pivot to upon completion of exposure. Under the circumstances of the tail 48 and the extension 45 being in that relative position, when the handle 49 is turned to right angle position it will be jacked or lifted up on top of said extension. This position of contact will happen very seldom, and will occur only in the one relative position just mentioned out of the numerous other possible stops along the entire path traversed by the tails 48. The effect will be simply that the hub 7 will slide out from the bushing 10 a distance sufficient only to compensate for this lifting, and which will be very small, after which the said hub will return immediately to its former position under the ordinary manual pressure on handle 49 by the operator in winding the film. Even this can be obviated by the operator, for at the time of grasping the handle 49 in turned down position, should there be the slightest resistance indicating the contact above mentioned, all that the operator has to do is to commence winding the film with the handle 49 in turned down position, and almost momentarily thereafter it will yield to right angle position, as the tail 48 passes off the top of extension 45, the distance of contact being negligible. However, I have provided a modification of certain parts, as shown in the lower portion of Fig. 5, which will automatically take care of this contact, so that neither the position of the hub 7 nor the changing position of the handle 49 will be affected by it. When the shutter mechanism is locked, the extension 45a will rest in the position similar to that shown in full lines in Fig. 2 of extension 45, with the exception that instead of the foot 44 being in direct contact with the lower edge of the swan 41, the flat spring 58, attached to the foot 44a intervenes and will be in contact with said swan in position immediately before compression. Should the handle 49, in turned down position, be at the place of contact aforementioned with extension 45a, as soon as said handle is turned to right angle position, the side of tail 48 will sidewipe the extension 45a by action on the bevel 60, against the tension of spring 58, so that when said handle is fully in right angle position, the relative position of the extension 45a and connected parts will be as shown in broken lines in Fig. 5, bearing against the exterior of tail 48. After the handle 49 is turned a short distance, the extension 45a will, under tension of spring 58, fall back within the path 47 in the position as shown by the full lines in Fig. 2, ready to form contact with tail 48 for unlocking the mechanism as soon as either tail reaches said extension in the continued revolution of said handle.

It is to be remembered that in this type of camera, the shutter mechanism is provided for merely two kinds of exposures, namely "instantaneous" and "time." The instantaneous exposure requires just one movement of the shutter lever 3, from position 4 to 5, or vice versa, wherever the said lever happened to be last located, and which single movement both opens and closes the shutter. The time exposure, and which is seldom resorted to, requires two movements of the shutter lever 3, that is from and back to the position where it last rested, either at 4 or at 5. The first movement opens and keeps open the shutter, and the second movement closes the shutter and completes the exposure at the end of any time desired by the operator. Under the circumstances of two movements, were there no provision in my locking mechanism for time exposure, the mechanism would lock on the first movement, as in the instantaneous exposure, with the result that the operator would be unable to return lever 3 to its first position in order to close the shutter. The key to the unlocking being the winding of the film in the manner aforesaid, the operator is not ready to wind the film until the shutter is closed on the return movement of lever 3. Consequently, I have provided for time exposure by means of the dial 30, which is fixed to the shaft 22, the latter being fixed to the plate 15; also by use of the flat spring 56, mounted loosely on shaft 22 between the head 57 and said dial. While the camera is used for instantaneous exposures, the spring 56 is allowed to rest under its own stress in neutral position through the cut 55 of said dial, as shown in Fig. 2. With this setting, the fork 27 is free to slide up and down from locking to unlocking position. Should a time exposure be desired, and for example the shutter lever 3 is then located at position 4, before operating the shutter lever, the spring 56 is lifted and turned to cut 54 and allowed to rest through that cut, under its own stress, as shown in Fig. 1. When the lever 3 is thereafter moved to position 5, the flange 26 of fork 27 will creep up on the end of spring 56 before the said fork has had any play to drop and be caught alongside of the side 34 for locking the mechanism, and while it is still on the path 33, the finish of this lever movement keeping the flange 29 above the path 33, as shown in Fig. 5. In the latter position, the mechanism will remain unlocked and free for the return movement of lever 3. On the return movement of said lever there is no obstruction for the opposite flange 25, and consequently the fork 27 is free to drop and automatically lock the mechanism. It is apparent that should the shutter lever 3 be located at the opposite position 5 before operating said lever for a time exposure, the spring 56 is set through cut 53, with the same result as aforesaid. It is thus also possible to take a succession of time exposures without a further adjustment or setting, and with the shutter lever 3 locking automatically only after the completion of each time exposure. Only when it is desired to revert to instantaneous exposures is the spring 56 moved to position in cut 55, remaining there without further attention during all the time that instantaneous exposures are uninterruptedly taken.

The gap between the flanges 19 and 20 must be of sufficient width to allow flange 29 to be pivoted on top of path 33 when the mechanism is first unlocked, without mutual interference between the arm 21 and accompanying parts, and the shutter lever 3. The swans 40 and 41 and adjacent parts are symmetrical in operation as to unlocking the mechanism from either side, and while one is in operative contact with flange 29 the other moves or rests idly precisely in the same position as if similar contact were had. For a certain distance of the movement in unlocking the mechanism the neck 42 or 43 lifts the fork 27, against the stress of the spring 23, and when the top of path 33 is reached and clearance is had of either the side 34 or the side 35, either neck throws back the fork 27 on to the path 33 as before stated, synchronously at which time there is no further movement of either of said necks, due to the fact that the tail 48 has then passed contact with extension 45. The swans 40 and 41 are fulcrumed sufficiently far from the tails 48 to make the weight of lifting the fork 27, against the stress of spring 23, comparatively light when the handle 49 is turned for winding the film.

When the mechanism is in locked position, the prongs of fork 27 are beside a substantial portion of the lower end of arm 21, which position, together with the interference of the sides 34 or 35 against the return movement of the projection 28, forms a positive stop against the return movement of lever 3, the said arm and fork becoming integral as it were against such return movement of said lever. In said locked position also the lever 3 prevents the projection 28 and all parts connected thereto from being pivoted away from either the side 34 or 35 in the direction opposite to the return movement of said projection.

It is also to be noted that the said lever 3, pivotally mounted in the conventional way, operates with an angular movement from and to the exterior surface of the outer wall 1 of the camera, alternately starting and ending at positions 4 and 5 respectively, at which two positions it is of equal and minimum height from the said surface. The shutter lever 3 is shifted by means of manual pressure applied to the outer side of flange 19 or 20 in the direction said lever can move. The arm 21 is pivoted low enough at shaft 22 to afford a large circular movement, and consequently sufficient side pressure, of flanges 19 and 20 against the lever 3 in order to shift said lever from one position to the other effectively. The dial 30 spreads far enough toward the flanges 19 and 20 to guard the horizontal position of the arm 21, otherwise braced very little due to the position of the shaft 22. The operator is not concerned with touching the lever 3 directly, nor with the angular movement of said lever, and controls the entire shifting of said shutter lever by the uniformly horizontal movement of the arm 21. In view of this, the flanges 19 and 20, both of equal height, have been made high enough to cover the height of the lever 3 from the surface of the camera wall 1 when said lever assumes its maximum height from said wall, that is midway between positions 4 and 5, as indicated in Fig. 3.

While I have shown and described one embodiment of my invention, it is obvious that it is not restricted thereto, but is broad enough to cover all structures that come within the scope of the annexed claims.

Having thus described my invention, what I claim is:

1. In a camera of the class described, means for exposing a portion of film, either for instantaneous or time exposure, means for shifting said portion after each exposure has been made, and means for automatically locking said exposure means, after each and either kind of said exposures has been completed regardless of any prior shifting of film and preventing operation as for a succeeding exposure until the exposed portion of film has been shifted, all of said exposure means being structurally independent of said locking means, and all of said locking means being assembled on one base and demountably superimposed as a unit on an external surface of said camera.

2. In a camera of the class described, means for exposing a portion of film, either for instantaneous or time exposure, means for shifting said portion after each exposure has been made, and means for automatically locking said exposure means, after each and either kind of said exposures has been completed regardless of any prior shifting of film, and preventing operation as for a second exposure of said portion while the same has not been shifted, all of said exposure means being structurally independent of said locking means, and all of said locking means being assembled on one base and demountably superimposed as a unit on an external surface of said camera.

3. In a camera of the class described, means for taking on a film either instantaneous or time exposures, and mechanism for shifting said film out of the field of exposure after each exposure has been made, said exposure means containing in its construction a camera box and a lever for opening and closing the shutter, means operatively engaged with said lever for automatically locking the same after each and either kind of said exposures has been made regardless of any prior shifting of film, and means operatively engaged with said shifting mechanism for automatically unlocking said lever after each portion of film has been shifted, all of said exposure means being structurally independent of said locking means, and all of said locking means being assembled on one base and demountably superimposed as a unit on an external surface of said camera.

4. In a camera of the class described, means for taking on a film either instantaneous or time exposures, and mechanism for shifting said film out of the field of exposure after each exposure has been made, said exposure means containing in its construction a camera box and a lever functioning with an angular movement from and to the exterior of said camera box for opening and closing the shutter, means operatively engaged with said lever for automatically locking the same after each and either kind of said exposures has been made regardless of any prior shifting of film, the said lever engaging means containing in its construction an arm with manual gripping means functioning in a horizontal plane for operating the said lever, the said lever being structurally independent of said arm, and the said arm being so disposed as to permit the locking and unlocking by said locking means without interfering with the normal structure or movement of said lever.

5. In a camera of the class described, means for taking on a film either instantaneous or time exposures, said means containing in its construction a camera box and a lever for opening and closing the shutter, means operatively associated with and for operating said lever for each exposure, and means connected with said associated means for automatically preventing the latter from being again operated after each and either kind of said exposures has been completed.

6. In a camera of the class described, means for taking on a film either instantaneous or time exposures, mechanism for shifting said film after each exposure has been made, said exposure means containing in its construction a camera box and a lever for opening and closing the shutter, means operatively associated with said lever for operating the same for each exposure, and means connected with said associated means and with said shifting mechanism for automatically preventing the lever from being again operated, after each and either kind of said exposures has been completed regardless of any prior shifting of film, until the exposed portion of film has been shifted.

7. In a camera of the class described, a camera box with means for taking on a film either instantaneous or time exposures, and means for shifting said film, said exposure means containing in its construction a shutter, and a lever for opening and closing the same, an arm pivoted at one end and associated with said lever for operating and thereafter locking the same, the said arm containing in its construction at the opposite end a flange on either side of said lever and of greater distance apart than the width of said lever, a fork slidably mounted on said arm with a spring from the latter bearing down on the former, a dial mounted on said pivot for keeping said arm and fork in the same plane, a projection leading from said fork, a plate for guiding said projection, a flange connected with said projection, two releases in meshing position for engaging said last named flange against the tension of said spring, a plate for carrying all of said associated means, an extension from one of said releases, and means suitably mounted on said shifting mechanism for engaging said extension and for unlocking said lever while the exposed portion of film is being shifted.

8. In a camera of the class described, a shutter mechanism with means for taking either an instantaneous or a time exposure, a lever for operating said shutter mechanism, and means operatively associated with said lever for automatically locking the same only after the shutter has been opened and closed and regardless of which kind of said exposures has been taken, all of said shutter mechanism, exposure taking means and the said lever being structurally independent of said locking means, and all of said locking means being assembled on one base and demountably superimposed as a unit on an external surface of said camera.

9. In a camera of the class described, a shutter mechanism for exposing portions of film either for instantaneous or time exposures, said mechanism containing in its construction a lever for operating the same, means operatively associated with said lever for automatically locking the same after any portion of the film has been exposed and either kind of said exposures completed, a film-winding mechanism, and means emanating from said film-winding mechanism and from said operatively associated means for automatically unlocking said lever while the film is being shifted without interference with the normal operation of said film-winding mechanism, all of said exposure means being structurally independent of said locking means, and all of said locking means being assembled on one base and demountably superimposed as a unit on an external surface of said camera.

10. In a camera of the class described, a camera box containing a shutter mechanism with means for taking either instantaneous or time exposures, a lever for operating said shutter mechanism, said lever and mechanism being separable from one portion of said box or not, means operatively associated with said lever and mounted on said portion for automatically locking said lever after an exposure of film has been completed, said associated means being such as not to interfere with the separation of said lever or with the return thereof, all of said shutter mechanism, exposure taking means and the said lever being structurally independent of said locking means, and all of said locking means being assembled on one base and demountably superimposed as a unit on an external surface of said camera.

11. In a camera of the class described, a shutter locking mechanism, a winding device with means for operating the same to wind a film, said means being rotatable in a certain plane for winding said film and containing in its construction a stem with a crosswise bar fixed therethrough laterally extending beyond each side of said stem, additional means detachably mounted on said bar adapted withdrawably to automatically function in a plane lower than said film winding plane, said mounting containing in its construction a guide and a spring interchangeably mounted on said bar extensions for keeping said additional means in predetermined operative position, and means emanating from said shutter locking mechanism and travelling in such lower plane for operative contact automatically with said additional means to unlock said shutter locking mechanism.

In witness whereof, I subscribe my signature.

LOUIS W. ROSEN.